United States Patent [19]

Buck et al.

[11] Patent Number: 4,932,256

[45] Date of Patent: Jun. 12, 1990

[54] HEAT TRANSMISSION MEASURING INSTRUMENT, IN PARTICULAR FLOW MONITOR

[76] Inventors: Robert Buck, Vogelherdbogen 67, 7992 Tettnang; Gerd Marhofer, Beckmannsbusch 67, 4300 Essen 1, both of Fed. Rep. of Germany

[21] Appl. No.: 382,883

[22] Filed: Jul. 21, 1989

[30] Foreign Application Priority Data

Jul. 23, 1988 [DE] Fed. Rep. of Germany ....... 3825059

[51] Int. Cl.$^5$ ................................................ G01F 1/68
[52] U.S. Cl. ................................ 73/204.22; 73/204.26
[58] Field of Search ............ 73/204.22, 204.26, 204.16

[56] References Cited

U.S. PATENT DOCUMENTS 3,595,079 7/1971 Grahn ............................. 73/204.22

FOREIGN PATENT DOCUMENTS 197709 9/1977 U.S.S.R. ........................... 73/204.26

Primary Examiner—Herbert Goldstein
Attorney, Agent, or Firm—Browdy & Neimark

[57] ABSTRACT

A heat transmission measuring instrument, namely a flow monitor for electric detection of heat losses in a flowing medium has a metal, circular-cylindrical measuring instrument housing (1) provided with an external thread (2), having a first temperature measuring element (3), having at least one heating element (4) and having a second temperature measuring element (5), wherein the first temperature measuring element (3), at least one heating element (4) and the second temperature measuring element (5) are applied to one side of a substrate foil (6) that is a good electrical insulator and a good thermal conductor, and the substrate foil (6) is put into thermally conductive contact with the measuring instrument housing (1) with its side remote from the temperature measuring elements (3, 5) and the heating element (4), at least in the regions in which the temperature measuring elements (3, 5) and the heating element (4) are applied. The manufacture of the flow monitor shown is simplified by providing that a plastic holder (11) adapted to the inside diameter of the measuring instrument housing (1) is provided, and the substrate foil (6) is disposed between the plastic holder (11) and the measuring instrument housing (1).

18 Claims, 5 Drawing Sheets

HEAT TRANSMISSION MEASURING INSTRUMENT, IN PARTICULAR FLOW MONITOR

FIELD OF THE INVENTION

The invention relates to a heat transmission measuring instrument, in particular a flow monitor for the electrical detection of heat losses in a flowing medium, the instrument having preferably a metallic, circular-cylindrical housing provided with an outer thread, a first temperature measuring element, at least one heating element, and a second temperature measuring element.

BACKGROUND

The invention is an improvement on various forms of known heat transmission measuring instruments (for instance, see Published, Unexamined German Patent applications No. DE-OS 24 47 617, 26 29 051, 32 13 902 and 32 22 046; also see copending application Ser. No. 07/172,457, now U.S. Pat. No. 4,856,329). In these heat transmission measuring instruments, hereinafter also called flow monitors, a differential temperature measurement is used. A first temperature measuring element measures a temperature (henceforth the "measured temperature") determined by the heating element and by the floWing medium, while a second temperature measuring element measures a temperature (henceforth the "reference temperature") that is determined by the flowing medium and if at all possible is not determined by the heating element or that is determined in some other manner. Accordingly the first temperature measuring element, a heating element and the second temperature measuring element are functionally necessary for flow monitors of this as is an evaluation circuit, the latter of type, which is of no further interest here.

If the medium the flow of which is to be monitored is a gas, the functionally necessary components—that is, the first temperature measuring element, the heating element and the second temperature measuring element—are introduced into the gas stream more or less unprotected. If the flow of a liquid medium is to be monitored, however, then the functionally necessary components—namely the first temperature measuring element, the heating element and the second temperature measuring element—cannot simply be introduced into the flow of liquid; instead, these components must be protected inside a measuring instrument housing.

In a flow monitor of the above type already used in industry, the measuring instrument housing is stepped; the first temperature measuring element and the heating element are located in a thinner part of the housing, while the second temperature measuring element is in a thicker part of the housing, on its end oriented toward the thinner part. The first temperature measuring element and the heating element are disposed in an aluminum disk; that is, the aluminum disk represents the thermal connection between the heating element and both the face end of the housing and the first temperature measuring element. The first temperature measuring element, the heating element and the aluminum disk are potted with an epoxy resin that is a good thermal conductor. The second temperature measuring element is spaced apart by a distance of approximately 1 cm from the face end of the measuring instrument housing, and is likewise potted with an epoxy resin that is a good thermal conductor. Because the heat of the heating element is not intended to reach the second temperature measuring element, material that is a good thermal insulator is located between the region in which the first temperature measuring element and the heating element are disposed and the region in which the second temperature measuring element is disposed.

The above-described flow monitor has significant disadvantages. First, it is thermally relatively sluggish; and second, it can be manufactured only at relatively high cost. However, the problem of how to construct a flow monitor of the type in question, which can react thermally relatively quickly and can be manufactured less expensively, has already been solved (see copending application Ser. No. 07/172,457) by providing that the first temperature measuring element, the heating element and the second temperature measuring element are applied to one side of a substrate foil that is a good electrical insulator and a good thermal conductor, and the substrate foil, on its side remote from the temperature measuring elements and the heating element, at least in the regions in which the temperature measuring elements and the heating element are applied, is put into thermally conductive contact with the measuring instrument housing. Preferably, the substrate foil is of polyimide, and has a thickness of approximately 50 to 150 $\mu$, in particular approximately 75 $\mu$. A substrate foil of this kind has extremely low thermal resistance and is a good electrical insulator; the dielectric breakdown voltage of such a substrate foil is many thousands of volts.

Because in the previously described flow monitor the functionally necessary components—the first temperature measuring element, the heating element and the second temperature measuring element—can be applied thermally practically directly onto the corresponding inside faces of the measuring instrument housing, the flow monitor according to the teachings of copending application Ser. No. 07/172,457 is thermally markedly fast-reacting. Since in this flow monitor it is also unnecessary to pot the functionally necessary components—the first temperature measuring element, the heating element and the second temperature measuring element—with an epoxy resin that is a good thermal conductor, this flow monitor can also be manufactured with less effort and expense. However, such heat transmission measuring instrument is still somewhat complicated and expensive from the manufacturing standpoint.

Accordingly, it is an object of the present invention to provide for a heat transmission measurement device which is simpler to manufacture and less expensive.

SUMMARY OF THE INVENTION

The heat transmission measuring instrument or flow monitor according to the invention in which the above object is attained is now characterized first and substantially in that a plastic holder adapted to the inside diameter of the measuring instrument housing is provided, and the substrate foil is disposed between the plastic holder and the measuring instrument housing. This makes it possible, before introducing the substrate foil with the components applied to it—that is the first temperature measuring element, the heating element and the second temperature measuring element—into the measuring instrument housing, the substrate foil provided with the aforementioned components can be wrapped around the plastic holder, and the plastic holder with the substrate foil provided with the functionally necessary components can be introduced into the measuring instrument housing.

The use according to the present invention of a plastic holder adapted to the inside diameter of the measuring instrument housing, in the manner described above, also has the primary result that the substrate foil, with its side remote from the temperature measuring elements and the heating element, can be put into thermally conductive contact with the measuring instrument housing securely and purposefully in those regions in which the temperature measuring elements and the heating element are applied. This is assured to be particularly advantageously if at least part of the plastic holder has an oblong slit; this makes it possible to select a somewhat larger outside diameter of the plastic holder compared with the inside diameter of the measuring instrument housing, so that when the plastic holder with the substrate foil wrapped around it is introduced, the resiliency of the plastic holder, achieved by the oblong slit, can be exploited.

It has been pointed out above that in the prior art the interior of the measuring instrument housing is at least partly filled with casting (potting) resin, namely epoxy resin. Introducing casting resin and preferably epoxy resin into the measuring instrument housing can also be recommended for the heat transmission measuring instrument or flow monitor according to the invention. To this end, a further feature of the invention, which has significance even independently of the above-described feature of the invention, provides that a sealing stopper is used above the first temperature measuring element, the heating element and the second temperature measuring element, and that casting resin, preferably epoxy resin, is poured in above the sealing stopper. As a result, the functionally necessary components, that is the first temperature measuring element, the heating element and the second temperature measuring element, remain free of casting resin; at the same time, casting resin provided in the measuring instrument housing hermetically seals off the electrical components from the outside. Also the casting resin can be poured in particularly simply, without getting into the region in which are located the first temperature measuring element, the heating element and the second temperature measuring element.

BRIEF DESCRIPTION OF DRAWING

The various aspects of the invention can be embodied and further developed in various ways, details of which will be explained below, in terms of an exemplary embodiment shown in the drawings, wherein.

DETAILED DESCRIPTION OF INVENTION

Figure 1:
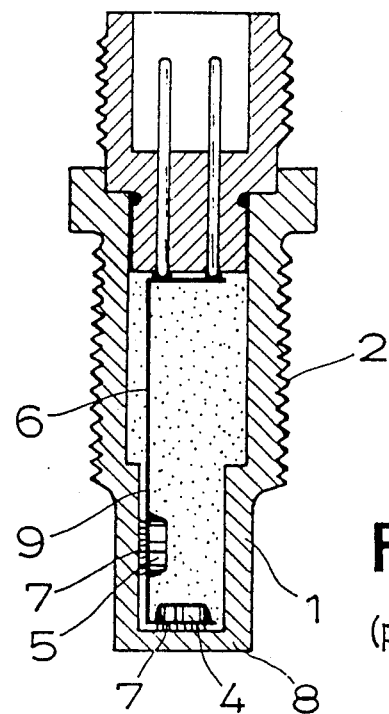
FIG. 1 is a schematic section through a first exemplary embodiment of a known flow monitor.

The heat transmission measuring instrument shown in the drawings is a flow monitor for the electrical detection of heat losses in a flowing medium and on a metal, circular-cylindrical measuring instrument housing, which is provided in part (see FIGS. 1, 3 and 11) or entirely (see FIG. 5) with an external thread 2, has a first temperature measuring element 3, a heating element 4 and a second temperature measuring element 5. The flow monitors shown in the figures operate by the principle of differential temperature measurement. The first temperature measuring element 3 measures a temperature determined by the heating element 4 and by the flowing medium, namely the measured temperature, while the second temperature measuring element 5 measures a temperature that if at all possible is not determined by the heating element 4 or is determined on some other way and is determined by the flowing medium, namely the reference temperature. Accordingly, the first temperature measuring element 3, the heating element 4 and the second temperature measuring element 5 are functionally necessary to the flow monitors shown.

With the flow monitors shown, the flow of the liquid medium, which may possibly be an aggressive medium, is to be monitored, so that the components necessary for the function—namely the first temperature measuring element 3, heating element 4 and second temperature measuring element 5—cannot simply be introduced into the liquid stream; these components necessary for the function are therefore disposed in the measuring instrument housing 1.

As shown, the first temperature measuring element 3, the heating element 4 and the second temperature measuring element 5 are applied to one side of a substrate foil 6 that is a good electrical insulator and a good thermal conductor, and the substrate foil 6 is put into thermally conductive contact, on its side remote from the temperature measuring elements 3, 5 and the heating element 4—at least in the regions in which the temperature measuring elements 3, 5 and the heating element 4 are applied—with the measuring instrument housing 1. The substrate foil 6 preferably comprises polyimide and has a thickness of approximately 50 to 150 $\mu$, in particular 75 $\mu$.

The flow monitor described is thermally remarkably fast reacting, because the first temperature measuring element 3, the heating element 4 and the second temperature measuring element 5 are disposed thermally practically directly on the inside faces of the measuring instrument housing. To improve the thermal conductivity even further, between the inside faces of the measuring instrument housing 1 and the first temperature measuring element 3, the heating element 4 and the second temperature measuring element 5 heat conducting paste 7 is provided between the substrate foil 6 and the measuring instrument housing 1 in those regions in which the temperature measuring elements 3, 5 and the heating element 4 are applied.

Figure 2:
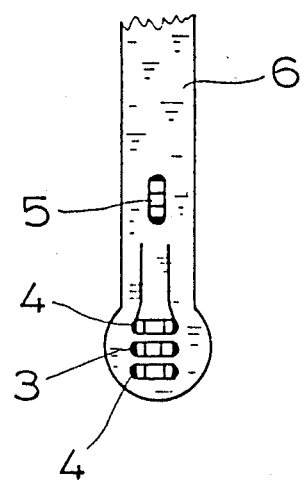
FIG. 2, on a larger scale than FIG. 1, shows the substrate foil of the flow monitor of FIG. 1 with the functionally necessary components disposed on it.
Figure 3:
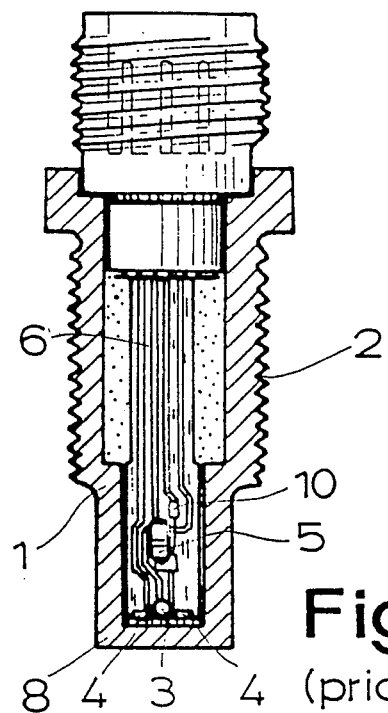
FIG. 3 is a schematic section through a second exemplary embodiment of a known flow monitor.
Figure 4:
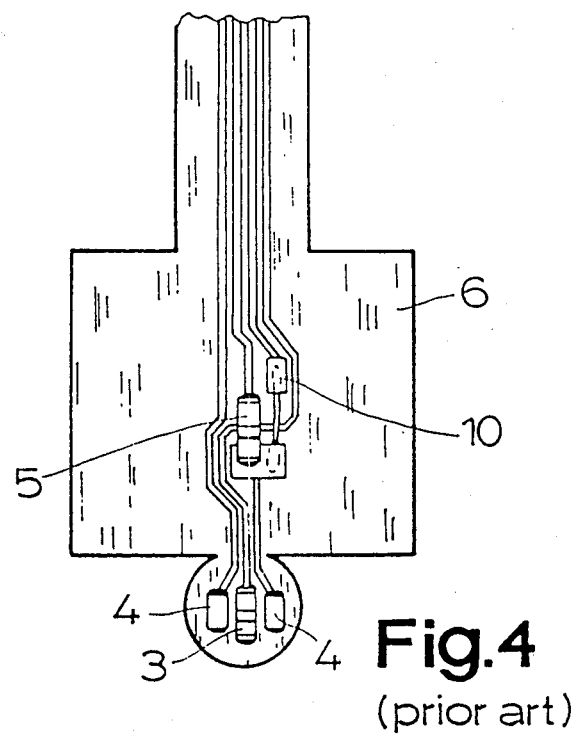
FIG. 4, on a larger scale than FIG. 3, shows the substrate foil of the flow monitor of FIG. 3 with the functionally necessary components disposed on it.
Figure 6:
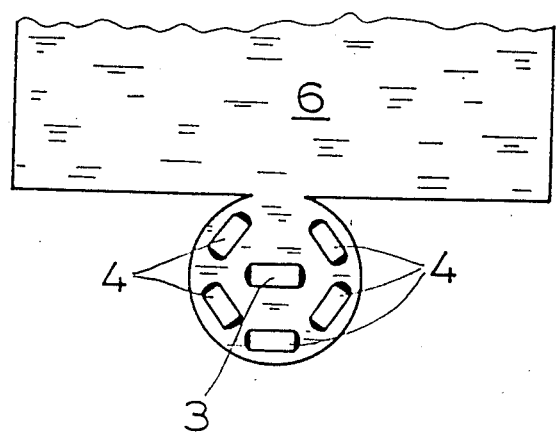
FIG. 6 on a larger scale, shows the substrate foil of a fourth exemplary embodiment of a known flow monitor, in part with the functionally necessary components disposed on it.

In the devices shown in FIGS. 1 and 2, and FIGS. 3 and 4, the first temperature measuring element 3 and the heating element 4 are disposed on the face end 8 of the measuring instrument housing 1, while the second temperature measuring element 5 is disposed spaced apart from the face end 8 of the measuring instrument housing 1 on the cylinder jacket 9 of the housing 1. In these exemplary devices, as FIGS. 2 and 4 show, two heating elements 4 are provided, and the first temperature measuring element is disposed between the two heating elements 4. Contrarily, FIG. 6 shows an exemplary device in which a plurality of heating elements 4, namely five heating elements 4 are provided, and the heating elements 4 are disposed in a circle around the first temperature measuring element 3.

In contrast to the exemplary devices of FIGS. 1 and 2, and FIGS. 3 and 4, FIG. 5 shows an exemplary device in which the first temperature measuring element 3, the heating element 4 and the second temperature measuring element 5 are disposed on the face end 8 of the measuring instrument housing 1. The heating element 4 is disposed between the first temperature measuring element 3 and the second temperature measuring element 5. This is a device in which it is possible to detect not only whether the medium the flow of which is to be monitored is in fact flowing, but also, with use as of a flow monitor, the direction of the flow.

In all the exemplary devices of flow monitors shown in the drawings, the first temperature measuring element 3, the heating element 4 or the heating elements 4 and the second temperature measuring element 5 are embodied as SMD components (surface mounted devices), some in the form of MELF components, some in the form of chips. If the first temperature measuring element 3, the heating element 4 or heating elements 4 and the second temperature measuring element 5 are embodied as chip components, then they are disposed with the measuring or heating film, respectively, face down on the substrate foil 6.

An essential feature in the exemplary devices described is that a substrate foil 6 that is a good electrical insulator and a good thermal conductor is provided, on which the first temperature measuring element 3, the heating element 4 and the second temperature measuring element 5 are applied. Consequently it is attractive to provide further components on the substrate foil 6, preferably further SMD components 10, as can be seen in FIGS. 3 and 4.

Figure 7:
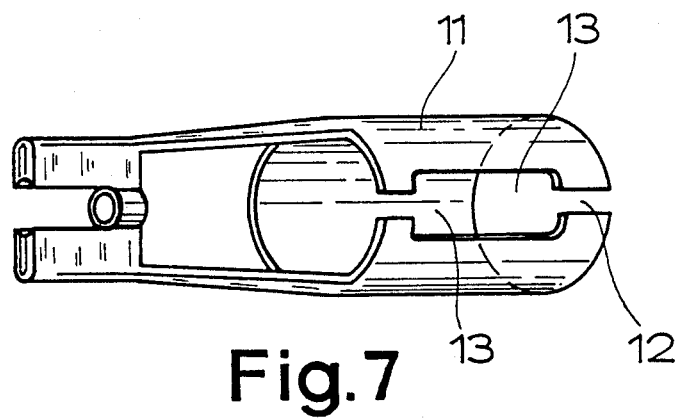
FIG. 7 shows a component, namely a plastic holder, for the flow monitor according to the invention.
Figure 11:
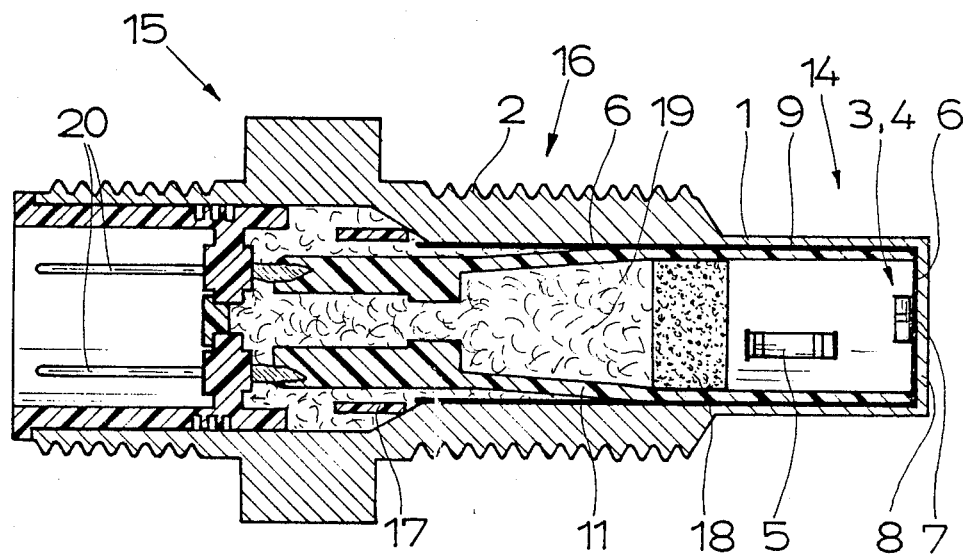
FIG. 11 is a section through a preferred exemplary embodiment of a flow monitor according to the invention.

In the flow monitor according to the invention, a plastic holder 11 adapted to the inside diameter of the measuring instrument housing 1 and shown by itself in FIG. 7 is now provided, and the substrate foil 6 is disposed between the plastic holder 11 and the measuring instrument housing 1, as FIG. 11 shows. The plastic holder 11 has an oblong slit 12 and also has recesses 13 at the locations corresponding to the first temperature measuring element 3, the one or more heating elements 4 and the second temperature measuring element 5.

Figure 5:
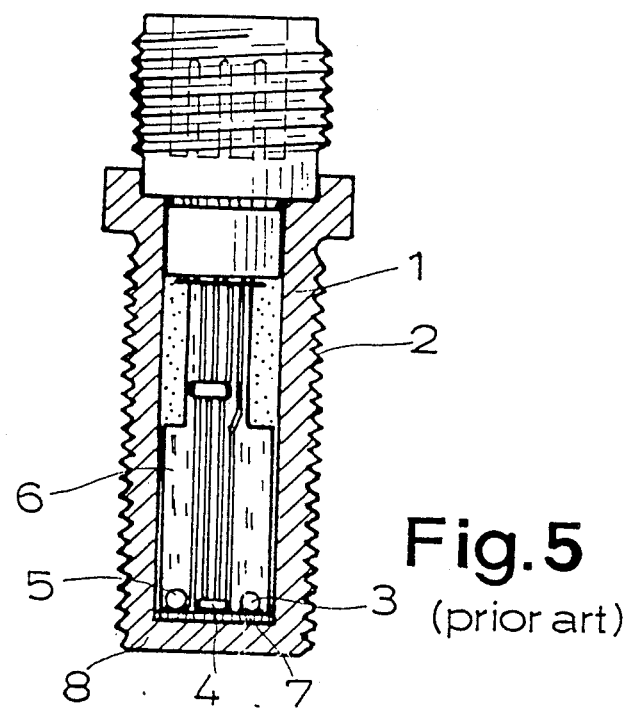
FIG. 5 is a schematic section through a third exemplary embodiment of a known flow monitor.

As FIGS. 1, 3, 5 and 11 show, the measuring instrument housing 1 in each case comprises a bottom region 14 receiving the first temperature measuring element 3, the heating element(s) 4 and the second temperature measuring element 5; a top region 15 serving for electrical connection; and a middle region 16 connecting the bottom and top regions. In the devices of FIGS. 1 and 3, the measuring instrument housing 1 has a larger inside diameter in its top region 15 and middle region 16 than in the bottom region 14. In the device of FIG. 5, the inside diameter of the housing 1 is the same throughout. In the exemplary embodiment of FIG. 11, contrarily, the housing 1 has a larger inside diameter in the top region 15 than in the bottom region 14 and the middle region 16.

Figure 8:
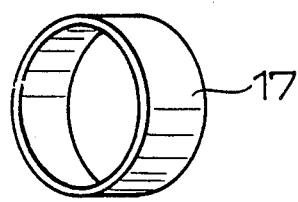
FIG. 8 shows a component, namely a mounting ring, used in a preferred exemplary embodiment of a flow monitor according to the invention.

For the preferred exemplary embodiment of the flow monitor according to the invention, a mounting ring 17 shown in detail in FIG. 8 is provided. Its inside diameter is adapted to the outside diameter of the plastic holder 11, and after the plastic holder 11 and substrate foil 6, wrapped around the plastic holder 11, have been introduced, the mounting ring 17 is located in the enlarged top region 15 of the housing 1.

FIGS. 1, 3, 5, 10 and 11 also show that the substrate foil 6 is connected directly to a connection plug 20.

Figure 9:
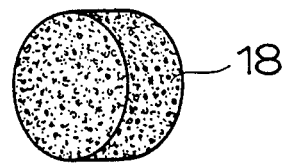
FIG. 9 shows a further component, namely a sealing stopper, also used in a preferred exemplary embodiment of a flow monitor according to the invention.
Figure 10:
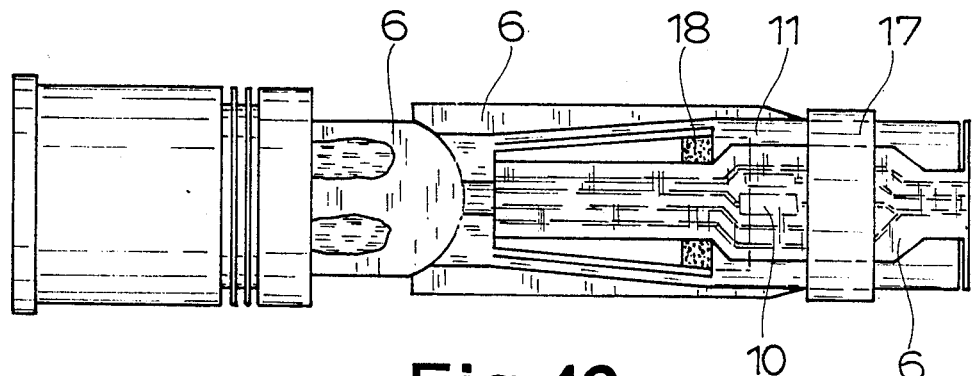
FIG. 10 is a front view of the components, preassembled, belonging to a preferred exemplary embodiment of a flow monitor according to the invention, shown prior to the introduction into the measuring instrument housing.

FIGS. 7-9 together, and FIGS. 10 and 11 in particular, show the course of the manufacture of the flow monitor:

First, the functionally necessary components, that is the first temperature measuring element 3, the one or more heating elements 4 and the second temperature measuring element 5, are applied to the substrate foil 6. Next, the substrate foil 6, with the components applied to it, is wrapped around the plastic holder 11. Then, the mounting ring 17 is slipped over the substrate foil 6 wrapped around the plastic holder 11, as shown in FIG. 10. Now the components, all preassembled and belonging to the flow monitor according to the invention, can be introduced into the measuring instrument housing 1. Since the mounting ring 17 has an outside diameter that is larger than the inside diameter of the housing 1 in the bottom region 14 and middle region 16, the mounting ring 17 remains in the top region 15 of the housing 1 during the insertion of the preassembled components into the measuring instrument housing 1; the preassembled components as shown in FIG. 10 are accordingly all pushed through the mounting ring 17. On the one hand, the plastic holder 11 has an outside diameter that is larger than the inside diameter of the housing 1 in the bottom region 14 and middle region 16; on the other, it has the oblong slit 12. When the preassembled components shown in FIG. 10 are inserted into the housing 1, the resiliency of the plastic holder 11, achieved by the oblong slit 12, is exploited. In the introduced state, it is thus assured that the substrate foil 6 comes reliably and purposefully into thermally conductive contact with the measuring instrument housing with its side remote from the temperature measuring elements 3, 5 and the heating element 4 or heating elements 4 in those regions in which the temperature measuring elements 3, 5 and the one or more heating elements 4 are applied.

After the introduction of the preassembled components into the housing 1, casting resin, preferably epoxy resin, is poured into the housing 1. The sealing stopper 18 assures that the casting resin cannot penetrate into the bottom region 14 of the measuring instrument housing 1, and consequently the casting resin does not come into contact with the first temperature measuring element 3, the one or more heating elements 4 and the second temperature measuring element 5.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a heat transmission measuring instrument, in particular a flow monitor, for the electrical detection of heat losses in a flowing medium, comprising a circular-cylindrical measuring instrument housing provided with an external thread, a first temperature measuring element, at least one heating element and a second temperature measuring element, wherein the first temperature measuring element, the heating element and the second temperature measuring element are applied to one side of a substrate foil that is a good electrical insulator and a good thermal conductor, and wherein with its side remote from the temperature measuring elements and the heating element, at least in those regions in which the temperature measuring elements and the heating element are applied, the substrate foil is brought into thermally conductive contact with the measuring instrument housing, the improvement wherein a plastic holder (11) adapted to the inside diameter of the measuring instrument housing (1) is provided, and the substrate foil (6) is disposed between the plastic holder (11) and the measuring instrument housing (1).

2. A heat transmission measuring instrument as defined by claim 1, wherein at least part of the plastic holder (11) has an oblong slit (12).

3. A heat transmission measuring instrument as defined by claim 1, wherein the plastic holder (11) has recesses (13) at locations corresponding to the first temperature measuring element (3), the heating element (4) and the second temperature measuring element (5).

4. A heat transmission measuring instrument as defined by claim 1, wherein the measuring instrument housing (1) comprises a bottom region (14), receiving the first temperature measuring element (3), the heating element (4) and the second temperature measuring element (5); a top region (15) serving to provide an electrical connection; and a middle region (16) connecting the bottom region (14) and the top region (15).

5. A heat transmission measuring instrument as defined by claim 4, wherein the measuring instrument housing (1) has a larger inside diameter in its top region (15) than in the bottom region (14) and middle region (16).

6. A heat transmission measuring instrument as defined by claim 5, wherein a mounting ring (17) adapted in its inside diameter to the outside diameter of the plastic holder (11) is provided, and after the introduction of the plastic substrate (11) and of the substrate foil (6) wrapped around the plastic holder (11), the mounting ring (17) is located in the enlarged top region (15) of the measuring instrument housing (1).

7. A heat transmission measuring instrument as defined by claim 2, wherein the plastic holder (11) has recesses (13) at locations corresponding to the first temperature measuring element (3), the heating element (4) and the second temperature measuring element (5).

8. A heat transmission measuring instrument as defined by claim 7, wherein the measuring instrument housing (1) comprises a bottom region (14), receiving the first temperature measuring element (3), the heating element (4) and the second temperature measuring element (5); a top region (15) serving to provide an electrical connection; and a middle region (16) connecting the bottom region (14) and the top region (15).

9. A heat transmission measuring instrument as defined by claim 2, wherein the measuring instrument housing (1) comprises a bottom region (14), receiving the first temperature measuring element (3), the heating element (4) and the second temperature measuring element (5); a top region (15) serving to provide an electrical connection; and a middle region (16) connecting the bottom region (14) and the top region (15).

10. A heat transmission measuring instrument as defined by claim 3, wherein the measuring instrument housing (1) comprises a bottom region (14), receiving the first temperature measuring element (3), the heating element (4) and the second temperature measuring element (5); a top region (15) serving to provide an electrical connection; and a middle region (16) connecting the bottom region (14) and the top region (15).

11. An instrument according to claim 1, further comprising a sealing stopper (18) above the first temperature measuring element (3), the heating element (4) and the second temperature measuring element (5), and potting resin thereabove.

12. A heat transmission measuring instrument as defined by claim 11, characterized in that the sealing stopper (18) comprises polyurethane foam.

13. A heat transmission measuring instrument as defined by claim 11, characterized in that the sealing stopper (18) is disposed inside the plastic holder (11).

14. A heat transmission measuring instrument as defined by claim 12, characterized in that the sealing stopper (18) is disposed inside the plastic holder (11).

15. A heat transmission measuring instrument, in particular a flow monitor, for the electrical detection of heat losses in a flowing medium, comprising a circular-cylindrical measuring instrument housing provided with an external thread, a first temperature measuring element, at least one heating element and a second temperature measuring element, wherein the first temperature measuring element, the heating element and the second temperature measuring element are applied to one side of a substrate foil that is a good electrical insulator and a good thermal conductor, and wherein with its side remote from the temperature measuring elements and the heating element, at least in those regions in which the temperature measuring elements and the heating element are applied, the substrate foil is brought into thermally conductive contact with the measuring instrument housing, the improvement wherein a sealing stopper (18) is provided above the first temperature measuring element (3), the heating element (4) and the second temperature measuring element (5), and casting resin located above the sealing stopper (18).

16. A heat transmission measuring instrument according to claim 1 wherein said measuring instrument housing is formed of metal.

17. A heat transmission measuring instrument according to claim 15 wherein said measuring instrument housing is formed of metal.

18. A heat transmission measuring instrument according to claim 15 wherein said casting resin is epoxy resin.

* * * * *